(12) United States Patent
Gonciulea et al.

(10) Patent No.: US 12,436,815 B2
(45) Date of Patent: Oct. 7, 2025

(54) SYSTEMS AND METHODS FOR USING DISTRIBUTED QUANTUM COMPUTING SIMULATORS

(71) Applicant: JPMORGAN CHASE BANK, N.A., New York, NY (US)

(72) Inventors: Constantin Gonciulea, Upper Arlington, OH (US); Vitaliy Dorum, New York, NY (US); Austin Gilliam, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1204 days.

(21) Appl. No.: 17/179,114

(22) Filed: Feb. 18, 2021

(65) Prior Publication Data

US 2022/0309374 A1 Sep. 29, 2022

Related U.S. Application Data

(60) Provisional application No. 62/978,263, filed on Feb. 18, 2020.

(51) Int. Cl.
*G06F 9/50* (2006.01)
*G06F 8/41* (2018.01)
(Continued)

(52) U.S. Cl.
CPC ........... *G06F 9/5066* (2013.01); *G06F 8/451* (2013.01); *G06F 9/4881* (2013.01);
(Continued)

(58) Field of Classification Search
CPC ... G06F 9/45533–52; G06F 2209/5017; G06F 8/451
See application file for complete search history.

(56) References Cited

U.S. PATENT DOCUMENTS 10,671,550 B1 * 6/2020 Doi ........................ G06F 3/0673
11,170,137 B1 * 11/2021 Richardson ............. G06F 30/20
(Continued)

OTHER PUBLICATIONS

Scaling cloud-native Apache Spark on Kubernetes for workloads in external storages Piotr Mrowczynski (Year: 2018).*
(Continued)

*Primary Examiner* — April Y Blair
*Assistant Examiner* — Paul V Mills
(74) *Attorney, Agent, or Firm* — GREENBERG TRAURIG LLP

(57) ABSTRACT

Systems and methods for using distributed quantum-based computing simulators are disclosed. In one embodiment, a method may include: (1) receiving, at a driver node and from a service, a set of operations and a location for each operation compiled from a set of quantum computing instructions provided by a client device; (2) generating, by the driver node, a declarative instantiation plan for the set of operations identifying a plurality of worker nodes, each worker node corresponding to one of the locations; (3) instantiating, by the driver node, the declarative instantiation plan; (4) issuing, by the driver node, the operations to the worker nodes based on the locations for each operation; (5) receiving, by the driver node, results from each worker node; (6) aggregating, by the driver node, the results; and (7) returning, by the driver node, the aggregated results to the client device via the service.

16 Claims, 2 Drawing Sheets

(51) Int. Cl.
| | | |
|---|---|---|
| *G06F 9/48* | (2006.01) | |
| *G06F 30/27* | (2020.01) | |
| *G06N 10/20* | (2022.01) | |
| *G06N 10/80* | (2022.01) | |
| *G06N 20/00* | (2019.01) | |

(52) U.S. Cl.
CPC ............ *G06F 9/5072* (2013.01); *G06F 30/27* (2020.01); *G06N 10/20* (2022.01); *G06N 10/80* (2022.01); *G06N 20/00* (2019.01); *G06F 2209/5017* (2013.01)

(56) References Cited

U.S. PATENT DOCUMENTS

| | | | |
|---|---|---|---|
| 2003/0121028 A1 | 6/2003 | Coury et al. | |
| 2005/0182614 A1 | 8/2005 | Meredith | |
| 2016/0094415 A1* | 3/2016 | Bonagiri | H04L 67/10 709/226 |
| 2019/0042677 A1* | 2/2019 | Matsuura | G06N 10/00 |
| 2019/0065241 A1 | 2/2019 | Wong et al. | |
| 2019/0102220 A1 | 4/2019 | Bishop et al. | |
| 2019/0340532 A1* | 11/2019 | Ducore | G06N 10/00 |
| 2019/0347575 A1* | 11/2019 | Pednault | G06F 30/30 |
| 2020/0184031 A1* | 6/2020 | Horii | G06N 10/20 |
| 2021/0132969 A1* | 5/2021 | Smith | G06N 10/00 |
| 2021/0406151 A1* | 12/2021 | Durazzo | G06N 10/80 |

OTHER PUBLICATIONS

Machine Learning in Compiler Optimization Zheng Wang and Michael O'Boyle (Year: 2018).*
QuEST and High Performance Simulation of Quantum Computers Tyson Jones, Anna Brown, Ian Bush, and Simon Benjamin (Year: 2018).*
qHiPSTER: The Quantum High Performance Software Testing Environment Mikhail Smelyanskiy, Nicolas Sawaya, and Alán Aspuru-Guzik (Year: 2016).*
Parallel Environment for Simulating Quantum Computation Geva Patz Master Thesis at the Massachusetts Institute of Technology (Year: 2003).*
QCMPI: A parallel environment for quantum computing ☆ Frank Tabakin a, Bruno Juliá-Díaz (Year: 2008).*
High-Performance Simulation of Interacting Multiparticle Quantum Walks with Apache Spark Andre Luiz Figueiredo de Albuquerque (Year: 2018).*
Automatic Generation of Distributed Run-time Infrastructure for Internet of Things Saleh Mohamed, Matthew Forshaw and Nigel Thomas (Year: 2017).*
Geelytics: Enabling On-demand Edge Analytics Over Scoped Data Sources Bin Cheng, Apostolos Papageorgiou, Martin Bauer (Year: 2016).*
0.5 Petabyte Simulation of a 45-Qubit Quantum Circuit Thomas Häner and Damian S. Steiger (Year: 2017).*
Distributed Memory Techniques for Classical Simulation of Quantum Circuits Ryan LaRose https://arxiv.org/abs/1801.01037 (Year: 2018).*
Designing a Fast and Flexible Quantum State Simulator Saveliy Yusufov, Charlee Stefanski, and Constantin Gonciulea (Year: 2023).*
International Search Report, dated Jun. 7, 2021, from corresponding International Application No. PCT/US2021/018579.
Written Opinion of the International Searching Authority, dated Jun. 7, 2021, from corresponding International Application No. PCT/US2021/018579.
Yunseong, Nam; et al: "Automated optimization of large quantum circuits with continuous parameters", Arxiv.Org, Cornell University Library, 201 Olin Library Cornell University Ithaca, NY 14853, Oct. 19, 2017.

* cited by examiner

SYSTEMS AND METHODS FOR USING DISTRIBUTED QUANTUM COMPUTING SIMULATORS

RELATED APPLICATIONS

The present application claims priority to, and the benefit of, U.S. Provisional Patent Application Ser. No. 62/978,263, filed Feb. 18, 2020, the disclosure of which is hereby incorporated, by reference, in its entirety.

BACKGROUND OF THE INVENTION

1. Field of the Invention

Embodiments are generally directed to systems and methods for using distributed quantum-based computing simulators.

2. Description of the Related Art

Although this technology is developing rapidly, quantum computers are still years away. In the meantime, quantum simulators are being used to study quantum systems.

SUMMARY OF THE INVENTION

Systems and methods for using distributed quantum-based computing simulators are disclosed. In one embodiment, a method for executing quantum computing instructions using a distributed quantum-based computing simulator may include: (1) receiving, at a driver node executed by a computer processor and from a service, a set of operations and a location for each operation compiled from a set of quantum computing instructions provided by a client device; (2) generating, by the driver node, a declarative instantiation plan for the set of operations, the declarative instantiation plan identifying a plurality of worker nodes, each worker node corresponding to one of the locations; (3) instantiating, by the driver node, the declarative instantiation plan, wherein the instantiation instantiates the plurality of worker nodes; (4) issuing, by the driver node, the operations to the worker nodes based on the locations for each operation, wherein the worker nodes execute the operation; (5) receiving, by the driver node, results from each worker node; (6) aggregating, by the driver node, the results; and (7) returning, by the driver node, the aggregated results to the client device via the service.

In one embodiment, the driver node may be executed by a cloud-based computer processor.

In one embodiment, the set of operations and locations may be optimized to maximize parallelism in processing the set of operations.

In one embodiment, the set of operations and locations may be optimized using a trained machine learning algorithm.

In one embodiment, a provisioning service may instantiate the declarative instantiation plan. The provisioning service may run a control loop and listens to informer events of instantiation progress and completion.

In one embodiment, at least one of the worker nodes may communicate with another of the worker nodes. Two of the plurality of worker nodes may pair up to execute one of the operations.

In one embodiment, the driver node may receive both intermediate and final results from the worker nodes.

According to another embodiment, a system for executing quantum computing instructions using a distributed quantum-based computing simulator may include: a client device providing a set of quantum computing instructions; a service that compiles the set of quantum computing instructions into a set of operations and a location for each operation; a driver node that generates a declarative instantiation plan for the set of operations, the declarative instantiation plan identifying a plurality of worker nodes, each worker node corresponding to one of the locations, instantiates the declarative instantiation plan, wherein the instantiation instantiates the plurality of worker nodes, and issues the operations to the worker nodes based on the locations for each operation; and a plurality of worker nodes that execute the issued operations and provide results to the driver node. The driver node may aggregate the results returns the aggregated results to the client device via the service.

In one embodiment, the driver node may be executed by a cloud-based computer processor.

In one embodiment, the set of operations and locations may be optimized to maximize parallelism in processing the set of operations.

In one embodiment, the set of operations and locations may be optimized using a trained machine learning algorithm.

In one embodiment, a provisioning service may instantiate the declarative instantiation plan. The provisioning service may run a control loop and listens to informer events of instantiation progress and completion.

In one embodiment, at least one of the worker nodes communicates with another of the worker nodes. Two of the plurality of worker nodes may pair up to execute one of the operations.

In one embodiment, the driver node may receive both intermediate and final results from the worker nodes.

According to another embodiment, a method for compiling quantum computing instructions for execution by a distributed quantum-based computing simulator may include: (1) receiving, at a service executed by a computer processor, a set of quantum computing instructions from a client device; (2) identifying a number of qubits in a prefix for the quantum computing instructions; (3) identifying a plurality of target qubits in the prefix; (4) optimizing the number of qubits in the prefix and the number of target qubits in the prefix to maximize parallel processing of the quantum computing instructions; and (5) compiling the quantum computing instructions into a set of operations, each operation associated with a location, wherein the number of locations may be based on the number of qubits in the optimized prefix.

In one embodiment, the number of qubits in the prefix and the number of target qubits in the prefix may be optimized using a trained machine learning algorithm.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to distributed quantum-based computing simulators.

Figure 1:
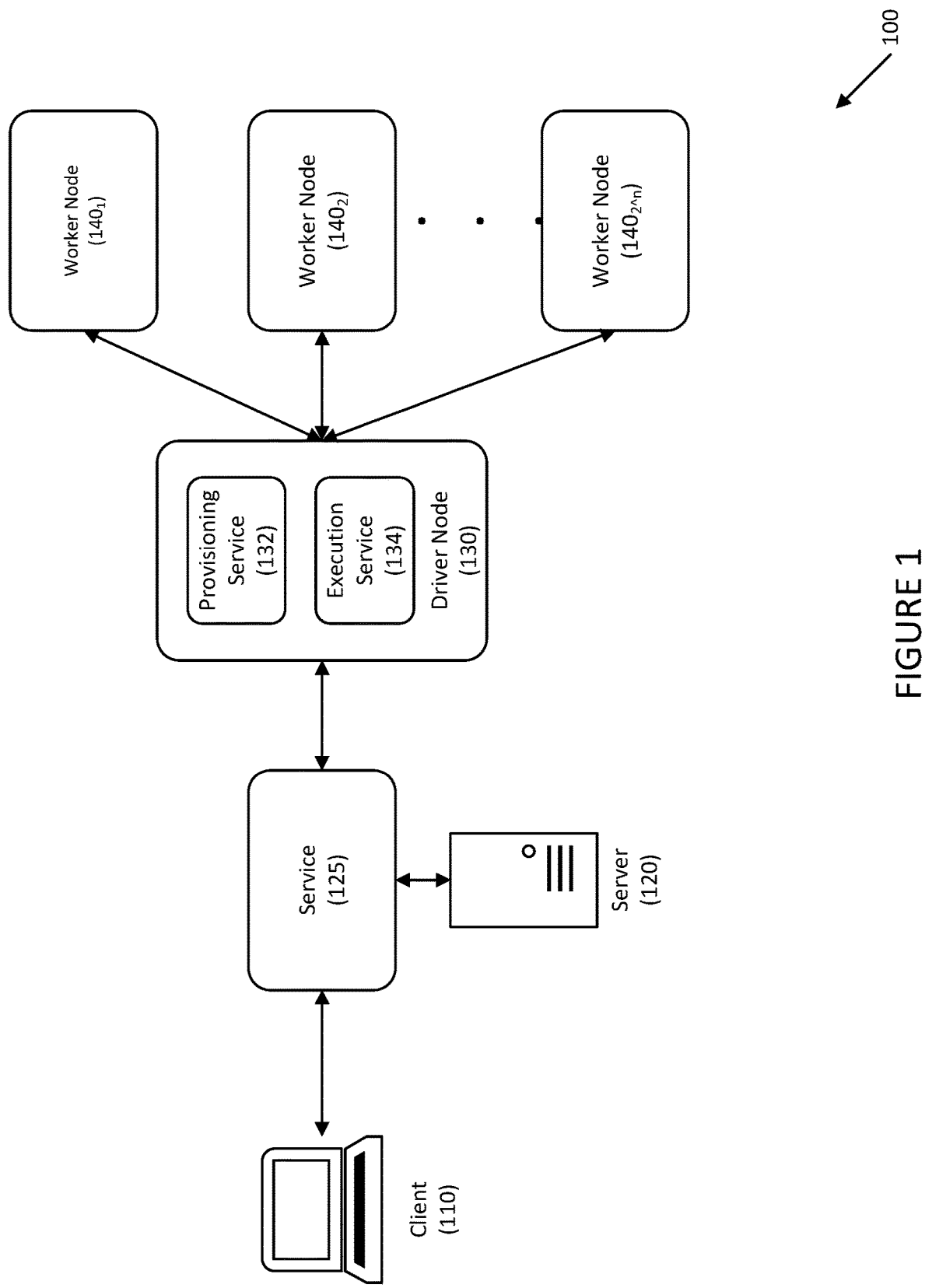
FIG. 1 depicts a distributed quantum-based computing simulator system according to an embodiment.

Referring to FIG. 1, a distributed quantum-based computing simulator system is disclosed according to one embodiment. In system 100, client 110, such as a workstation or any other suitable computing device, may interface with service 125 executed by service 120. In one embodiment, service 125 may be a web service. For example, during initialization, client 110 may send quantum computing instructions to service 125.

In response to receiving the quantum data from client 110, service 125 may compile the quantum computing instructions into a set of operations that are to be invoked in order to satisfy the computation. In one embodiment, service 125 may perform any additional validation as is necessary and/or desired.

In one embodiment, the set of operations consists may include a plurality of defined operations and a location (e.g., one of worker nodes 140) for executing the defined operation. In one embodiment, the location may be identified using a binary string (e.g., a prefix, such as 00; 01; 10; 11).

In one embodiment, service 120 may optimize the configuration of worker nodes 140 based on, for example, available computing resources, quantum operation(s) being executed, etc.

Service 125 may provide may send the compiled set of operations with the locations to driver node 130. Driver node 130 may compose a declarative instantiation plan and may provide this to provisioning service 132 to instantiate compute resources (e.g., worker nodes 140) based on the declarative instantiation plan. An example of provisioning service is a Kubernetes scheduler.

Provisioning service 132 may run a control loop and listens to informer events of instantiation progress and completion.

In one embodiment, once initialization is complete, worker nodes 140 may return an acknowledgement (ACK) to driver node 130. Once ACKs from all worker nodes are received, driver node 130 may return an ACK to service 120, which may then return the ACK to client 110.

Once compute resources are instantiated, driver node 130 may send the appropriate operations to each worker node 140 based on the location. For example, each worker node 140 may receive its own set of operations based on the location (e.g., the binary prefix) for each operation.

Driver node 130 may assign or issue each worker node 140 a variable set of dimensions (qubits) and the fixed values for the other dimensions. In one embodiment, the fixed values may be the prefix for that node.

In one embodiment, each worker node 140 may know to contact another worker node 140 should there be a dependency (e.g., worker node $140_1$ waits for the output of worker node $140_2$ before completing its operation). This may be, for example, a result of a target qubit being in the prefix for the worker node.

In one embodiment, driver node 130 and worker nodes 140 may be cloud-based nodes. In one embodiment, driver node 130 and worker nodes 140 may be provided as a Custom Resource Definition on top of a Kubernetes engine.

An illustrate, non-limiting implementation example is as follows. Driver node 130 and worker nodes 140 may be Kubernetes containers and may communicate using gRPC. The gRPC protocol supports streaming, which makes implementation faster. Service 120 may be a web service that may be exposed as a REST endpoint.

Driver node 130 may be specific to a computation. The gRPC protocol may use Protocol Buffers as a serialization mechanism. The processing on each driver node 130 maximizes parallelism by using all the CPUs or GPUs on the box. The parallel processes are specific to the language being used. For example, Go procs and channels may be used for concurrent synchronization.

Figure 2:
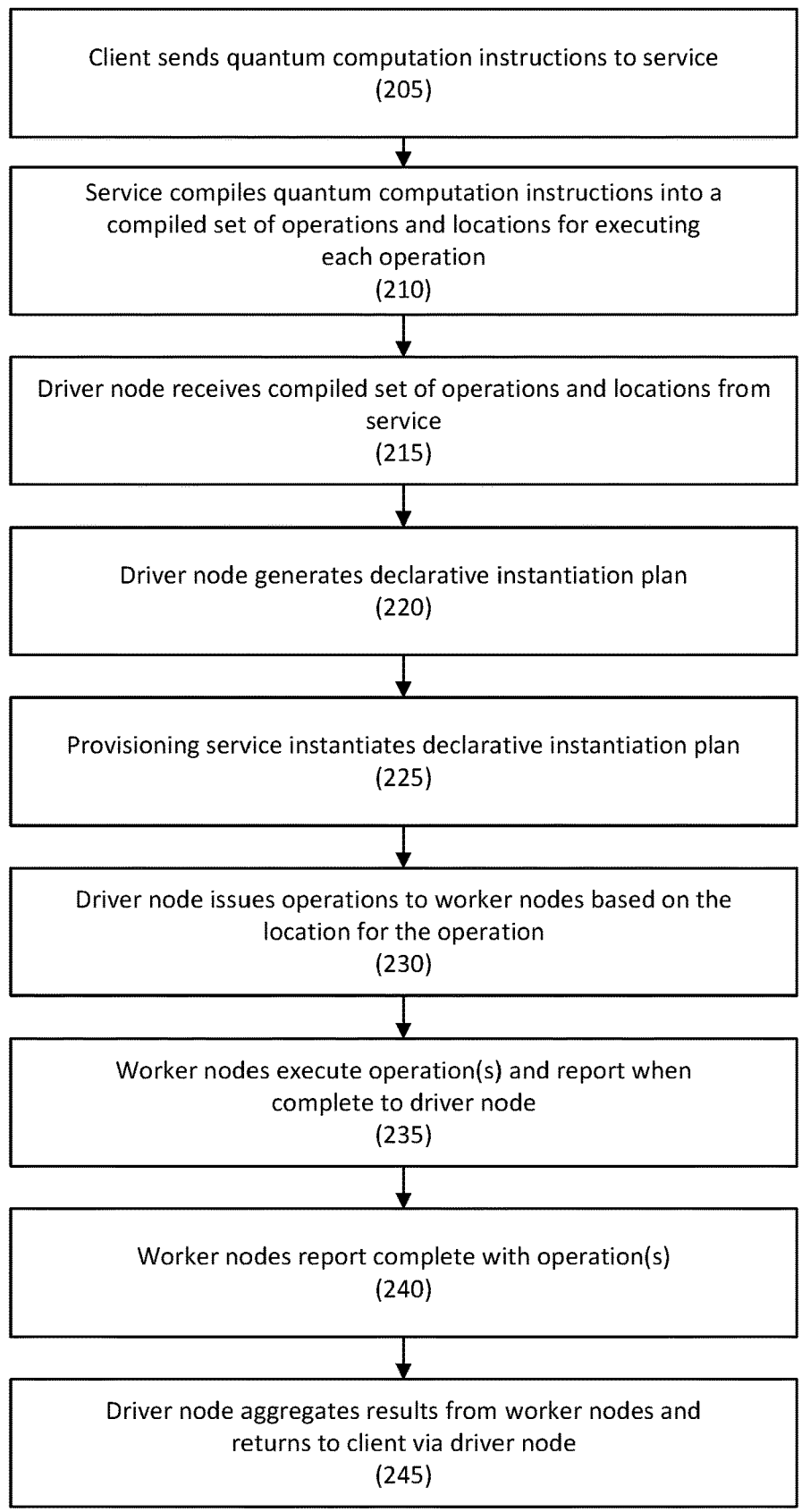
FIG. 2 depicts a method for executing quantum computing instructions using a distributed quantum-based computing simulator system according to an embodiment.

Referring to FIG. 2, a method for execution quantum computing instruction(s) using a distributed quantum-based computing simulator system is disclosed according to an embodiment.

In step 205, a client computing device provides a quantum computing program and a set of computational specifications to a service, such as a web service. In one embodiment, the computational specifications may include, for example, quantum computation instructions.

For example, the client device may send a set of instructions to the service as web requests, which may send the instructions in bulk (or individually, depending on the implementation details) to the driver node as gRPC requests.

In step 210, the service may compile the quantum computation instructions. For example, the service may compile the quantum computation instructions into a set of operations, and a location (e.g., worker node) to execute each operation.

In one embodiment, the service may optimize the configuration of the worker nodes based on, for example, available computing resources, the type of quantum computing operations (e.g., gates), etc.

In one embodiment, compiler may identify the qubits corresponding to a prefix (e.g., the inputs to a quantum computing operation) and the qubits corresponding to the suffix (e.g., the output of the quantum computing operation). In one embodiment, the prefix and the suffix may be identified by different registers; in another embodiment, the service may identify the prefix and the suffix.

In one embodiment, the number of worker nodes is based on the number of qubits in the prefix (e.g., $2^p$, where p is the number of prefix qubits). In general, the greater the number of qubits in the prefix, the greater number of worker nodes, resulting in a greater number of parallel operations.

If, however, the prefix includes a target qubit, this dependency will cause worker nodes to pair up, as the input to one worker node is the output of another. Thus, the compiler may seek to optimize the number of qubits in the prefix while minimizing the number of target qubits in the prefix.

In one embodiment, machine learning may be used to analyze the quantum calculation and produce the most optimal prefix/suffix configuration. For example, a cost may be applied to each configuration, such as the time to compute with that configuration, and an algorithm may be trained to selects prefix/suffix setups that minimize that cost, based on the features of a given quantum calculation.

In one embodiment, an X gate (e.g., a swap) may be applied to the right-most qubit in a single register (the target qubit), and the service may identify the binary labels that differ only in the target qubit, and blend their corresponding amplitudes according to the definition of the gate. For example, worker node 01 may manage both 010 and 011.

In step 215, the service may provide the compiled set of operations and locations to a driver node in a distributed computing system.

In step 220, the driver node may receive the compiled set of operations, and the locations for executing each instruction, from the service and may compose a declarative instantiation plan. In step 225, a provisioning service provided by the driver node may to instantiate compute resources (e.g., worker nodes) based on the declarative instantiation plan.

The provisioning service may run a control loop and may listen to informer events of instantiation progress and completion.

In step 230, once the resources are instantiated, the driver node may issue the relevant operations to each worker node based on the location prefix for each operation.

In step 235, the worker nodes may execute the operations that were issued by the driver node. In one embodiment, the worker nodes may communicate with each other to, for example, request a result for a dependency.

For example, a gate instruction consists of a target qubit, optional control qubits, and the type of gate (e.g., X, Y, Z, Hadamard, Rx, Ry, Rz, etc.). The worker nodes may either process the transformation individually, or may pair up with another worker node, depending on the target qubit.

The worker nodes may return intermediate and final results of the operations to the driver node. For example, for $2^n$ binary strings, each position is how the corresponding qubit is measured, 0 or 1. The driver node receives both intermediate and final results of the computation.

In one embodiment, if a target qubit is in the prefix (indicating a dependency), the worker nodes will "pair up" and may share their work. For example, if there are four worker nodes corresponding to prefixes 00, 01, 10, and 11, and a gate is applied to the left-most qubit in the prefix, then worker nodes 00 and 10 need to pair up, as do 01 and 11. The worker nodes may divide the processing evenly and complete the work at the same time, but regardless we have worker nodes dependent on each other, which in general is slower than the alternative.

If a target qubit is in the suffix, this means that each worker node can process its operations individually, which maximizes parallelism.

In step 240, the worker nodes may report when they are complete with executing their operation(s).

In step 245, the driver node may aggregate the results from the worker nodes, and may provide the aggregated results to the client via the service.

As another example, a measurement instruction may request some or all of the amplitudes from each worker node, which may be collected by the driver node and returned to the client as raw numbers or as through a visualization mechanism. An example of a pixel-based visualization system is disclosed in U.S. Provisional Patent Application Ser. No. 62/978,252 filed Feb. 18, 2020, the disclosure of which is hereby incorporated, by reference, in its entirety.

In one embodiment, after execution is complete, the driver node may "destroy" the instantiated worker nodes.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for executing quantum computing instructions using a distributed quantum-based computing simulator, comprising:
   identifying, by a compiling service, a number of qubits in a prefix for the quantum computing instructions received from a client device;
   identifying, by the compiling service, a plurality of target qubits in the prefix;
   optimizing, by the compiling service, the number of qubits in the prefix and the number of target qubits in the prefix to maximize parallel processing of the quantum computing instructions;
   compiling, by the compiling service, the quantum computing instructions into a set of operations, each operation associated with a location, wherein the number of locations is based on the number of qubits in the optimized prefix;
   receiving, at a driver node executed by a computer processor and from the compiling service, the set of operations and a worker node for each operation;
   generating, by the driver node, a declarative instantiation plan for the set of operations, the declarative instantiation plan identifying each of the worker nodes;
   instantiating, by the driver node, the declarative instantiation plan, wherein the instantiation instantiates the worker nodes;
   issuing, by the driver node, the operations to the worker node for each operation, wherein the worker nodes execute the operation;
   receiving, by the driver node, results from each worker node;
   aggregating, by the driver node, the results; and
   returning, by the driver node, the aggregated results to the client device via the service.

2. The method of claim 1, wherein the driver node is executed by a cloud-based computer processor.

3. The method of claim 1, wherein the set of operations and locations are optimized to maximize parallelism in processing the set of operations.

4. The method of claim 1, wherein a provisioning service instantiates the declarative instantiation plan.

5. The method of claim 4, wherein the provisioning service runs a control loop and listens to informer events of instantiation progress and completion.

6. The method of claim 1, wherein at least one of the worker nodes communicates with another of the worker nodes.

7. The method of claim 1, wherein two of the plurality of worker nodes pair up to execute an operation.

8. The method of claim 1, wherein the driver node receives both intermediate and final results from the worker nodes.

9. A system for executing quantum computing instructions using a distributed quantum-based computing simulator, comprising:
   a client device providing a set of quantum computing instructions;
   a compiling service that identifies a number of qubits in a prefix for the quantum computing instructions, identifies a plurality of target qubits in the prefix, optimizes the number of qubits in the prefix and the number of target qubits in the prefix to maximize parallel processing of the quantum computing instructions, and compiles the set of quantum computing instructions into a set of operations, each operation associated with a location, wherein the number of locations is based on the number of qubits in the optimized prefix;
   a driver node that receives, from the compiling service, the set of operations and a worker node for each operation and generates a declarative instantiation plan for the set of operations, the declarative instantiation plan identifying each of the worker nodes, instantiates the declarative instantiation plan, wherein the instantiation instantiates the worker nodes, and issues the operations to the worker node for each operation; and
   a plurality of worker nodes that execute the issued operations and provide results to the driver node;
   wherein the driver node aggregates the results returns the aggregated results to the client device via the compiling service.

10. The system of claim 9, wherein the driver node is executed by a cloud-based computer processor.

11. The system of claim 9, wherein the set of operations and locations are optimized to maximize parallelism in processing the set of operations.

12. The system of claim 9, wherein a provisioning service instantiates the declarative instantiation plan.

13. The system of claim 12, wherein the provisioning service runs a control loop and listens to informer events of instantiation progress and completion.

14. The system of claim 9, wherein at least one of the worker nodes communicates with another of the worker nodes.

15. The system of claim 9, wherein two of the plurality of worker nodes pair up to execute an operation.

16. The system of claim 9, wherein the driver node receives both intermediate and final results from the worker nodes.

* * * * *